(12) United States Patent
Wen et al.

(10) Patent No.: US 9,146,409 B2
(45) Date of Patent: Sep. 29, 2015

(54) LCD, ARRAY SUBSTRATE OF LCD AND METHOD FOR REPAIRING BROKEN LINE

(75) Inventors: Songxian Wen, Shenzhen (CN);
Mingfeng Deng, Shenzhen (CN);
Yizhuang Zhuang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 888 days.

(21) Appl. No.: 13/377,149

(22) PCT Filed: Sep. 26, 2011

(86) PCT No.: PCT/CN2011/080179
§ 371 (c)(1),
(2), (4) Date: Dec. 8, 2011

(87) PCT Pub. No.: WO2013/004054
PCT Pub. Date: Jan. 10, 2013

(65) Prior Publication Data
US 2013/0002975 A1     Jan. 3, 2013

(30) Foreign Application Priority Data
Jul. 1, 2011 (CN) .......................... 2011 1 0184336

(51) Int. Cl.
*G02F 1/13* (2006.01)
*G02F 1/1362* (2006.01)

(52) U.S. Cl.
CPC .. *G02F 1/1309* (2013.01); *G02F 2001/136263* (2013.01)

(58) Field of Classification Search
CPC ................ G02F 1/36259; G02F 2001/136263; G02F 1/1309
USPC ...................................................... 349/54–55
See application file for complete search history.

(56) References Cited

U.S. PATENT DOCUMENTS 8,023,058 B2 * 9/2011 Han et al. ......................... 349/54
2009/0284679 A1 * 11/2009 Kim et al. ....................... 349/54

FOREIGN PATENT DOCUMENTS

CN     101110204 A     1/2008

OTHER PUBLICATIONS

2nd Office Action of Chinese Patent Application No. 201110184336.4 issued by Chinese Patent Office.

* cited by examiner

*Primary Examiner* — Bumsuk Won
*Assistant Examiner* — Charles Chang

(57) ABSTRACT

A liquid crystal display (LCD), an array substrate of the LCD and a method for repairing a broken line are disclosed. According to the present disclosure, a detection line and a repairing line are disposed on an array substrate of the LCD, the detection line is connected to a non-defective scan line and the repairing line is connected to a broken line; and when a scan signal is detected by the repairing IC via the detection line, a repairing signal is outputted at an appropriate time to repair the broken line via the repairing line. With this arrangement of the LCD and the method for repairing a broken line of the present disclosure, broken scan lines that are detected in the LCD after the cell process can still be repaired. This reduces the reject ratio, avoids unnecessary waste and lowers the manufacturing cost.

18 Claims, 3 Drawing Sheets

LCD, ARRAY SUBSTRATE OF LCD AND METHOD FOR REPAIRING BROKEN LINE

BACKGROUND

1. Technical Field

The present disclosure relates to the technical field of liquid crystal displaying, and more particularly, to a liquid crystal display (LCD), an array substrate of an LCD, and a method for repairing a broken line.

2. Description of Related Art

A TFT-LCD (thin film transistor liquid crystal display) mainly comprises an LCD panel, a timing controller and driving integrated circuits (IC). The LCD panel mainly consists of an array substrate, a color filter (CF) substrate and a liquid crystal material sandwiched therebetween. On the array substrate are formed a plurality of scan lines for supplying scan signals and a plurality of data lines for supplying data signals.

The timing controller is configured to generate a timing control signal necessary for the driving ICs. The driving ICs include a data driving IC and a scan driving IC. The data driving IC is connected to a source of each TFT via a corresponding data line respectively to control an input voltage at the source of the TFT so that a data signal can be inputted; and the scan driving IC is connected to a gate of each TFT via a corresponding scan line respectively to turn on or off the gates of each row of TFTs by controlling a scan voltage of the row of TFTs.

The scan lines and the data lines are formed on the array substrate in an array process. The scan lines are arranged in a horizontal direction on the array substrate, while the data lines are arranged in a vertical direction on the array substrate. The scan lines and the data lines intersect with each other in a displaying region to form a plurality of displaying units, each of which corresponds to one TFT. Through the corresponding TFT, twisting of liquid crystal molecules in a region of the displaying unit can be controlled so as to display an image.

In the practical manufacturing process, breaking of scan lines (including respective connecting lines leading from the scan driving IC) is known as a major defects occurring in a array process. Breaking of scan lines mostly occurs at the back end of the array process, and when a broken scan line is detected through detection, it need to be repaired correspondingly.

For a broken scan line that is found prior to a cell process, it is generally repaired by means of bridging through chemical vapor deposition (CVD) because processing can still be made on the array substrate at this time. However, for a broken scan line that is found after the cell process, it is impossible to repair it by means of bridging through CVD because the array substrate and the CF substrate have been assembled into an cell. On the other hand, a lot of broken scan lines or broken connecting lines may still be found during the light-up inspection after the cell process or even be reported in customers' feedback. The practice currently adopted is to reject such defective products, which represents a considerable waste and leads to a high manufacturing cost.

BRIEF SUMMARY

A primary objective of the present disclosure is to provide an LCD, an array substrate of the LCD and a method for repairing a broken line that allow for repairing of a broken scan line so as to reduce the manufacturing cost.

The present disclosure provides an LCD, which comprises an array substrate and a timing controller. The array substrate comprises a plurality of scan lines. The timing controller is configured to output a timing signal for controlling a scanning signal to scan the scan lines one by one. The LCD further comprises:

a detection line located on the array substrate, being adapted to connect a $n^{th}$ last non-defective scan line preceding a broken line to a repairing IC so that when the scanning signal scans the $n^{th}$ last non-defective scan line preceding the broken line, the scanning signal is transmitted to a repairing IC;

the repairing IC, being connected to the timing controller and configured to obtain a time $T1$ necessary for the scanning signal to scan an adjacent scanning line and output a repairing signal at a time $T=n*T1$ after the scanning signal has been received; and a repairing line located on the array substrate, being adapted to connect the broken line to the repairing IC so that the repairing signal is transmitted to the broken line to repair the broken line.

Preferably, the repairing line includes a first repairing line and a second repairing line, and when there are two broken lines, the first repairing line and the second repairing line connect to the two broken lines respectively.

Preferably, the repairing IC is also configured to, when there are two broken scanning lines, output the repairing signal at the time $T=n*T1$ and then output the repairing signal again at a time $T=(n+m+1)*T1$, wherein m is the number of scanning lines between the two broken lines.

Preferably, the detection line and the repairing line connect to the repairing IC respectively in a COF manner or a COG manner.

Preferably, the repairing IC is integrated on a circuit board of an LCD panel module.

Preferably, the repairing line and the broken line are fused together by means of laser.

Preferably, the detection line and the $n^{th}$ last non-defective scan line preceding the broken line are fused together by means of laser.

Preferably, the repairing IC is soldered to the circuit board of the LCD panel module.

The present disclosure further provides a method for repairing a broken line in an LCD, comprising:

determining location of a broken line and a $n^{th}$ last non-defective scanning line preceding the broken line;

soldering a repairing IC to the LCD;

connecting a detection line to the $n^{th}$ last non-defective scanning line preceding the broken line through fusion; and connecting a repairing line to the broken line through fusion.

Preferably, the method further comprises the following step after determining locations of the broken line and the $n^{th}$ last non-defective scanning line preceding the broken line:

writing information into the repairing IC so that when a driving IC scans the $n^{th}$ last non-defective scan line preceding the broken line, a repairing signal will be outputted at a time $T=n*T1$, wherein $T1$ is a time necessary for a scanning signal to scan an adjacent scan line and is obtained by the repairing IC via a timing controller.

The present disclosure further provides an array substrate of an LCD, which comprises a plurality of scan lines. The LCD comprises a timing controller configured to output a timing signal for controlling a scanning signal to scan the scan lines one by one. The array substrate further comprises:

a detection line located on the array substrate, being adapted to connect a $n^{th}$ last non-defective scan line preceding a broken line to a repairing IC so that when the scanning signal scans the $n^{th}$ last non-defective scan line preceding the broken line, the scanning signal is transmitted to the repairing IC;

the repairing IC, being connected to the timing controller of the LCD and configured to obtain a time T1 necessary for the scanning signal to scan an adjacent scanning line and output a repairing signal at a time T=n*T1 after the scanning signal has been received; and a repairing line located on the array substrate, being adapted to connect the broken line to the repairing IC so that the repairing signal is transmitted to the broken line to repair the broken line.

Preferably, the repairing line includes a first repairing line and a second repairing line, and when there are two broken lines, the first repairing line and the second repairing line connect to the two broken lines respectively.

Preferably, the repairing IC is also configured to, when there are two broken scanning lines, output the repairing signal at the time T=n*T1 and then output the repairing signal again at a time T=(n+m+1)*T1, wherein m is the number of scanning lines between the two broken lines.

Preferably, the detection line and the repairing line connect to the repairing IC respectively in a COF manner or a COG manner.

Preferably, the repairing IC is integrated on a circuit board of an LCD panel module.

Preferably, the repairing line and the broken line are fused together by means of laser.

Preferably, the detection line and the $n^{th}$ last non-defective scan line preceding the broken line are fused together by means of laser.

Preferably, the repairing IC is soldered to the circuit board of the LCD panel module.

According to the LCD, the array substrate of the LCD and the method for repairing a broken line of the present disclosure, broken scan lines that are detected in the LCD after the cell process can still be repaired. This reduces the reject ratio, avoids unnecessary waste and lowers the manufacturing cost.

In order to make the technical solutions of the present disclosure more apparent and obvious, the present disclosure will be further detailed hereinbelow with reference to the attached drawings.

DETAILED DESCRIPTION

It shall be understood that, the embodiments described herein are only intended to illustrate but not to limit the present disclosure.

According to the technical solutions of embodiments of the present disclosure, a detection line and a repairing line are disposed on an array substrate of the LCD, the detection line is connected to a non-defective scan line and the repairing line is connected to a broken line; and when a scan signal is detected by the repairing IC via the detection line, a repairing signal is outputted by the repairing IC at an appropriate time to repair the broken line via the repairing line.

Figure 1:
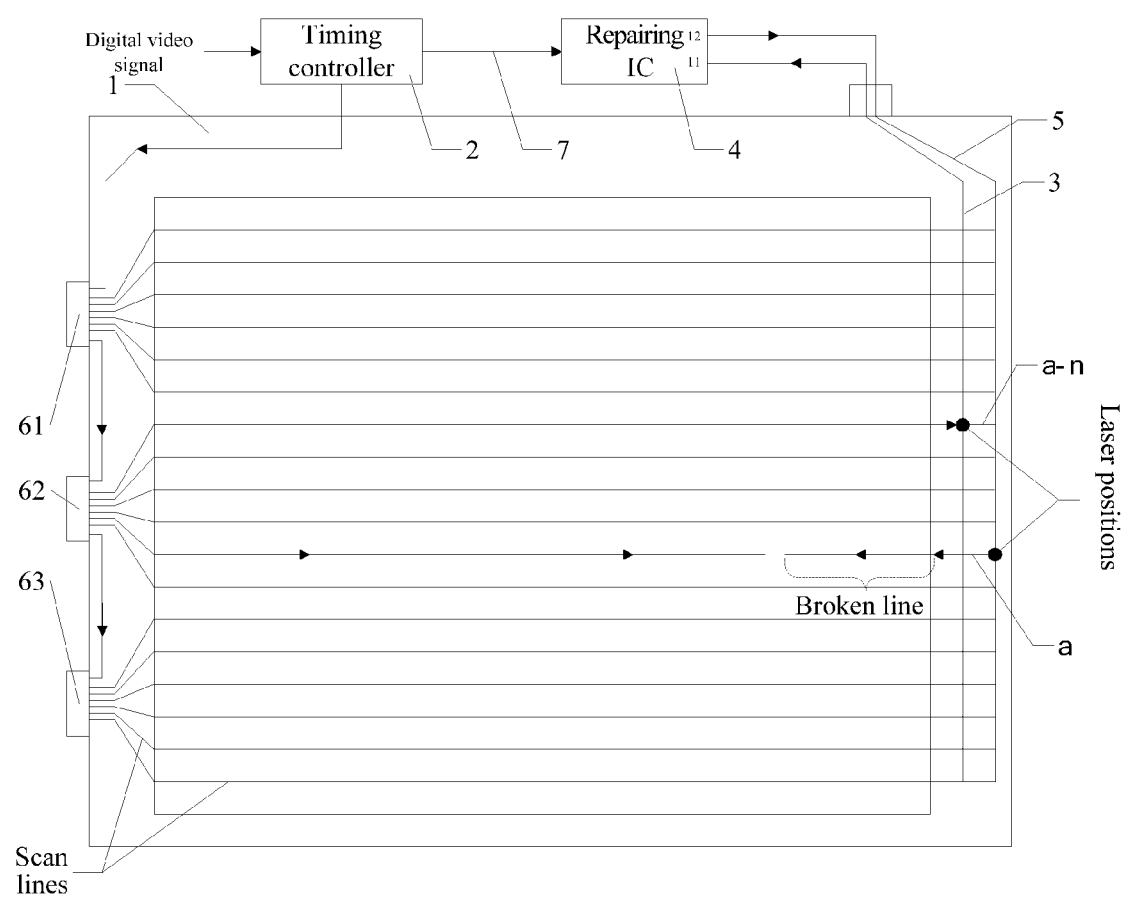
FIG. 1 is a schematic structural view of an array substrate of an LCD according to a first embodiment of the present disclosure.

Referring to FIG. 1, there is shown a schematic structural view of an LCD according to a first embodiment of the present disclosure. As shown in FIG. 1, the LCD of this embodiment comprises an array substrate 1, a timing controller 2, scan driving ICs, a detection line 3 and a repairing line 5, and a repairing IC 4.

A plurality of scan lines and data lines (with the data lines being not shown) are disposed on a display region of the array substrate 1. In the display region, the scan lines are arranged in a horizontal direction and the data lines are arranged in a vertical direction on the array substrate 1. The scan lines and the data lines intersect with each other (the data lines span the scan lines but are not electrically connected thereto) in the displaying region to define a plurality of displaying units, each of which corresponds to one TFT. The TFT has a gate connected to a horizontal scan line, a source connected to a vertical data line and a drain connected to a pixel electrode.

Gates of all TFTs on a same horizontal scan line are connected together, so a voltage on the scan line is applied to all the TFTs simultaneously. Therefore, if a high enough positive voltage is applied on a certain scan line, then all the TFTs on the scan line will be turned on so that a corresponding data signal is inputted via the data line to charge the pixel electrode to an appropriate voltage level. Then, a high enough negative voltage is applied to turn off the TFTs so that charges are kept across the liquid crystal capacitor until a next data signal is written again. Then, a next horizontal scan line is enabled to input a corresponding data signal. In this way, data signals of a whole frame are written sequentially, and then a next data signal writing cycle begins from the first scan line.

The timing controller 2 is a core part for controlling the timing sequence of the whole displaying operation. The horizontal scanning is enabled according to the timing of each video frame to be displayed, and a video signal inputted by an interface is converted into a data signal suitable for use by the data driving circuit and then transmitted to the data driving IC (not shown). Then, the timing of driving the data lines is controlled appropriately in concert with the horizontal scanning. Under the control of the timing controller 2, the data driving IC stores digital video signals from the high-frequency input into a memory, and in response to enabling of a specific scan line, converts the corresponding digital video signal into a voltage for output to the pixel electrode to drive a data line on the array substrate 1.

Also under the control of the timing controller 2, the scan driving IC outputs an appropriate enabling/disabling voltage to specific scan lines sequentially to drive the scan lines of the TFT-LCD panel.

Because the number of pins of the scan driving IC is limited, the number of scan lines in a high-definition TFT-LCD panel is greater than the number of pins that can be driven by one scan driving IC, so more than one scan driving IC is needed in one panel. As shown in FIG. 1, in this embodiment, a plurality of scan lines are connected to the scan driving ICs 61, 62, 63 respectively (sections of the scan lines that are not parallel with each other are also termed as connecting lines), and the scan driving ICs 61, 62, 63 are connected in series to form a driving IC module. Enabling of the scanning of the scan driving IC 61 is controlled by the timing controller, and enabling of the scanning of the scan driving IC 62 is controlled by a pulse output from the last-stage shift register of the scan driving IC 61; by cascading the scan driving ICs in this way, the scan driving voltages necessary for the whole panel can be obtained.

A detection line 3 and a repairing line 5, which are disposed at an edge of the array substrate 1, are arranged in a vertical direction. The detection line 3 and the repairing line 5 are overlapped with but are not electrically connected to the scan lines. The detection line 3 and the repairing line 5 may be formed simultaneously with the scan lines in the array process.

When it is determined that a scan line is broken, a repairing IC 4 is soldered to a corresponding location on a module circuit board in such a way that the repairing IC 4 is connected to the timing controller 2 via a wire 7 and the pins 11, 12 of the repairing IC 4 are connected to the detection line 3 and the repairing line 5 respectively in a COF (Chip On Flex) manner. Another common way for connection is to adhere the detection line 3 and the repairing line 5 on the TFT glass substrate directly, i.e., in a COG (Chip On Glass) manner.

When the timing controller 2 transmits a timing signal to the scan driving ICs 61~63, the timing signal is transmitted to the repairing IC 4 synchronously. A time T1 necessary for the scan signal to scan an adjacent scan line is calculated by the repairing IC 4. Then, in case there is a broken scan line, the repairing IC 4 will be triggered to output a repairing signal through calculation so that the scanning signal is re-acquired in the broken section of the scan line. In this way, the TFTs corresponding to the broken section of the scan line can be turned on.

As shown in FIG. 1, when an $a^{th}$ scan line is broken, then no scan signal is transmitted to the section to the right of the breaking position, so this section is determined as a broken scan line. In this case, an $n^{th}$ last non-defective scan line preceding the broken scan line is chosen as a basis for triggering. The value of n is set as a fixed value and is written into the repairing IC 4 so that the repairing IC 4 can output the repairing signal at an appropriate timing. For example, it may be set as n=2, 3, 4, 5, and so on. By setting a $(a-n)^{th}$ scan line before the $a^{th}$ scan line as a basis for triggering the repairing IC 4, the repairing IC 4 will output the repairing signal at a time T=n*T1 correspondingly.

By using laser technology, the $(a-n)^{th}$ scan line and the detection line 3 can be fused together at the position where they intersect with each other insulatedly, and the $a^{th}$ scan line and the repairing line 5 can be fused together at the position where they intersect with each other insulatedly. In this way, the metal material at the intersection positions will be fused together so that electric paths will be formed between the $(a-n)^{th}$ scan line and the detection line 3 and between the $a^{th}$ scan line and the repairing line 5 respectively.

The repairing IC 4 is not merely limited to be soldered onto the module circuit board of the LCD, but may also be disposed at other sites provided that it is connected to the timing controller 2, the detection line 3 and the repairing line 5.

When the timing controller 2 controls the scanning signal to scan the $(a-n)^{th}$ scan line, the scanning signal is transmitted to the repairing IC 4 along the detection line 3. Upon detecting this signal, the repairing IC 4 is triggered to output a repairing signal after a time T=n*T1. The repairing signal is transmitted to the right section of the $a^{th}$ scan line via the repairing line 5 so that the broken section is repaired. At this time point, the timing controller 2 also controls the scan signal to scan the $a^{th}$ scan line from the left side. Through scanning from both sides, the $a^{th}$ scan line can resume the normal operation to result in normal displaying on the LCD.

Figure 2:
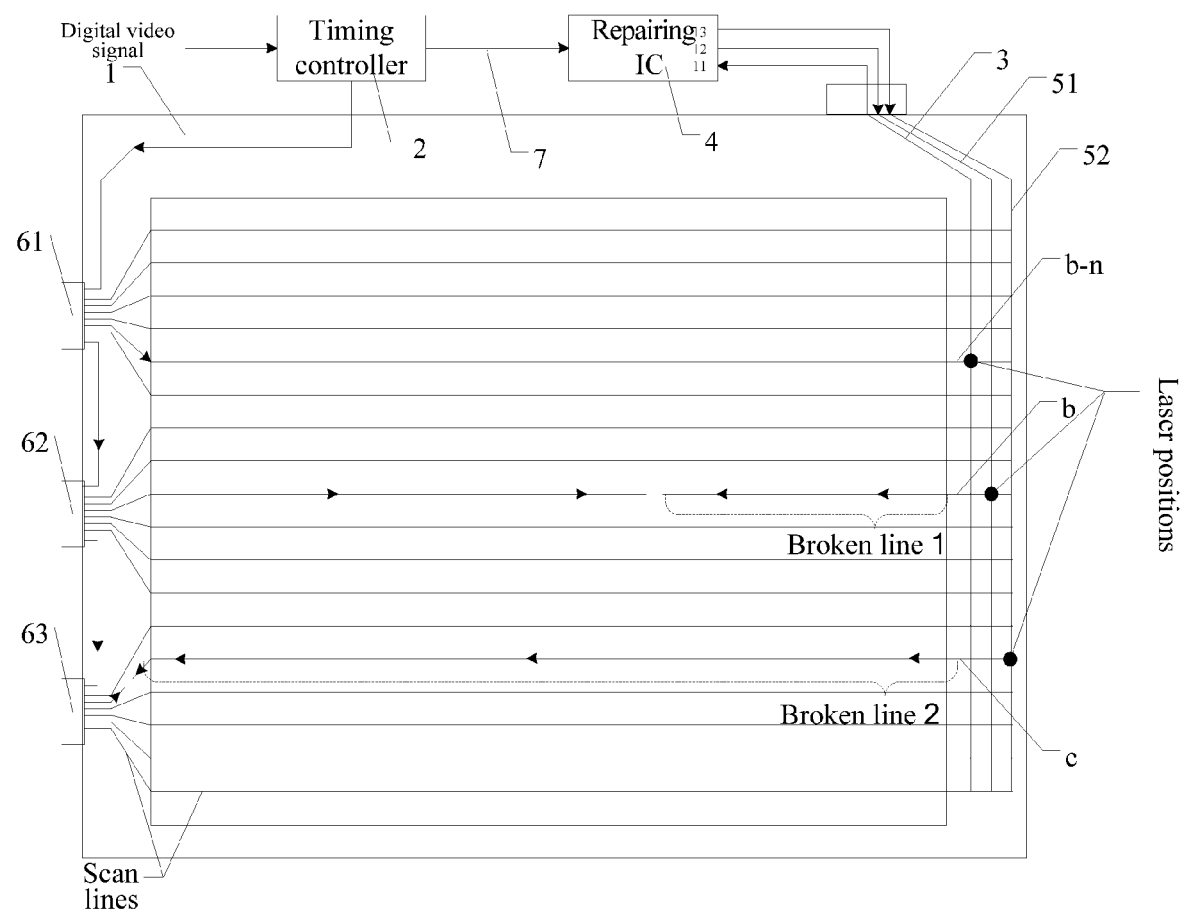
FIG. 2 is a schematic structural view of an array substrate of an LCD according to a second embodiment of the present disclosure.

Referring to FIG. 2, there is shown a schematic structural view of an LCD according to a second embodiment of the present disclosure. The LCD of this embodiment contemplates all technical features of the array substrate 1, the timing controller 2 and the scan driving ICs described in the first embodiment. This embodiment differs from the first embodiment in that, there are two repairing lines in this embodiment. Specifically, this embodiment comprises a detection line 3 and a first repairing line 51 and a second repairing line 52. The detection line 3, the first repairing line 51 and the second repairing line 52 are disposed at an edge of the array substrate 1, and are arranged in a vertical direction. The detection line 3, the first repairing line 51 and the second repairing line 52 are overlapped with but are not electrically connected to the scan lines. The detection line 3, the first repairing line 51 and the second repairing line 52 may be formed simultaneously with the scan lines in the array process.

When it is determined that a scan line is broken, the repairing IC 4 is soldered to a corresponding location on the module circuit board in such a way that the repairing IC 4 is connected to the timing controller 2 via a wire 7 and the pins 11, 12 of the repairing IC 4 are connected to the detection line 3, the first repairing line 51 and the second repairing line 52 respectively in a COF (IC On Flex) manner. Another common way for connection is to adhere the detection line 3, the first repairing line 51 and the second repairing line 52 on the TFT glass substrate directly, i.e., in a COG (IC On Glass) manner.

When the timing controller 2 transmits a timing signal to the scan driving ICs, the timing signal is transmitted to the repairing IC 4 synchronously. A time T1 necessary for the scan signal to scan an adjacent scan line is calculated by the repairing IC 4. Then, in case there is a broken scan line, the repairing IC 4 will be triggered to output a repairing signal through calculation so that the scanning signal is re-acquired in the broken section of the scan line. In this way, the TFTs corresponding to the broken section of the scan line can be turned on.

As shown in FIG. 2, when a $b^{th}$ scan line and a $c^{th}$ scan line are broken, then no scan signal is transmitted to the section to the right of each of the breaking positions, so these sections are determined as broken lines 1 and 2. In this case, a $n^{th}$ last non-defective scan line preceding the broken line 1 is chosen as a basis for triggering. The value of n is set as a fixed value and is written into the repairing IC 4 so that the repairing IC 4 can output the repairing signal for repairing the broken line 1 at an appropriate timing. For example, it may be set as n=2, 3, 4, 5, and so on. By setting a $(b-n)^{th}$ scan line before the $b^{th}$ scan line as a basis for triggering the repairing IC 4, the repairing IC 4 will output the repairing signal at a time T=n*T1 correspondingly.

Meanwhile, the number of scan lines m between the $b^{th}$ scan line and the $c^{th}$ scan line is calculated and written into the repairing IC 4 so that, when the repairing IC 4 is triggered, the repairing IC 4 will output a repairing signal at a time T=(n+m+1)*T1.

Then, by using laser technology, the $(b-n)^{th}$ scan line and the detection line 3 can be fused together at the position where they intersect with each other insulatedly, the $b^{th}$ scan line and the first repairing line 51 can be fused together at the position where they intersect with each other insulatively, and the $c^{th}$ scan line and the second repairing line 52 can be fused together at the position where they intersect with each other insulatedly as shown in FIG. 2. In this way, the metal materials at the intersection positions will be fused together so that electric paths will be formed between the broken line 1 and the first repairing line 51, between the broken line 2 and the second repairing line 52, and between the $(b-n)^{th}$ scan line and the detection line 3 respectively.

The repairing IC 4 is not merely limited to be soldered onto the module circuit board of the LCD, but may also be disposed at other sites provided that it is connected to the timing controller 2, the detection line 3, the first repairing line 51 and the second repairing line 52.

When the timing controller 2 controls the scanning signal to scan the $(b-n)^{th}$ scan line, the scanning signal is transmitted to the repairing IC 4 via the detection line 3. Upon detecting this signal, the repairing IC 4 is triggered to output a repairing signal after a time $T=n*T1$. The repairing signal is transmitted to the right section of the $b^{th}$ scan line via the first repairing line 51 so that the broken section of the $b^{th}$ scan line is repaired. At this time point, the timing controller 2 also controls the scan signal to scan the $b^{th}$ scan line from the left side. Through scanning from both sides, the $b^{th}$ scan line can resume the normal operation. Also, the repairing IC 4 outputs a repairing signal after a time $T=(n+m+1)*T1$. The repairing signal is transmitted to the right section of the $c^{th}$ scan line via the second repairing line 52 so that the broken section of the $c^{th}$ scan line is repaired. At this time point, the timing controller 2 also controls the scan signal to scan the $c^{th}$ scan line from the left side. Through scanning from both sides, the $c^{th}$ scan line can resume the normal operation. Consequently, the LCD can display an image normally.

Based on the concepts of the present disclosure described above, in case of more than two broken lines, a corresponding number of repairing lines may also be disposed to connect with the broken lines and corresponding values are written in the repairing IC 4 so that repairing signals are outputted at appropriate time points by the repairing IC 4.

Figure 3:
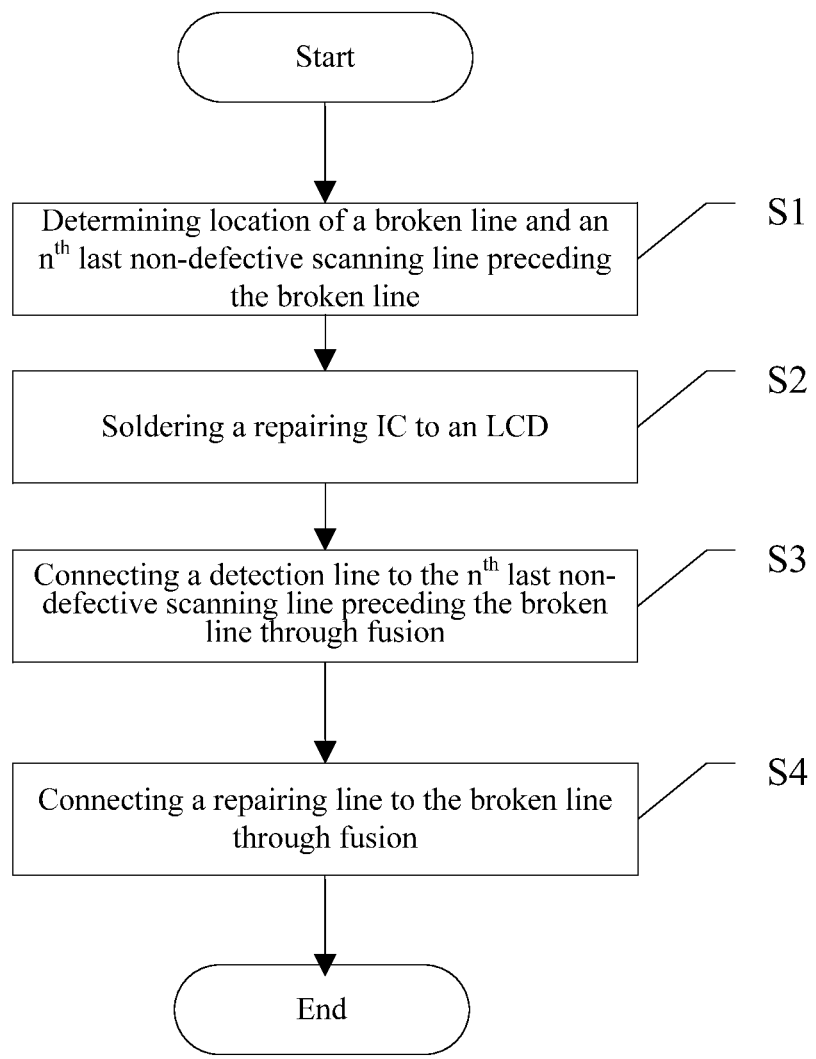
FIG. 3 is a schematic flowchart diagram of a method for repairing a broken line according to a third embodiment of the present disclosure.

Referring to FIG. 3, there is shown a flowchart diagram of a method for repairing a broken line in an LCD according to a third embodiment of the present disclosure. This method is based on the structure of the LCD described above in FIG. 1 and FIG. 2. As shown in FIG. 3, this method comprises the following steps.

S1: determining location of a broken line and a $n^{th}$ last non-defective scanning line preceding the broken line.

By inputting a signal to the LCD to light it up, the number and locations of broken lines are determined. Then, an $n^{th}$ last non-defective scan line preceding the broken scan line is chosen as a basis for triggering. The value of n is set as a fixed value and is written into a repairing IC so that the repairing IC can output the repairing signal at an appropriate timing. For example, it may be set as n=2, 3, 4, 5, and so on. After being triggered, the repairing IC will output a repairing signal at a time $T=n*T1$ correspondingly. In case there is a plurality of broken lines, the number m of scan lines between another broken line and the first broken line must also be calculated so that the repairing IC will also output a repairing signal at the time $T=(n+m+1)*T1$.

S2: soldering the repairing IC to the LCD.

When it is determined that a scan line is broken, the repairing IC is soldered to a corresponding location on the module circuit board in such a way that the repairing IC is connected to the timing controller via a wire and the pins thereof are connected to the detection line and the repairing line respectively in a COF (IC On Flex) manner. Another common way for connection is to adhere detection line and the repairing line on the TFT glass substrate directly, i.e., in a COG (IC On Glass) manner.

When the timing controller 2 transmits a timing signal to the scan driving ICs, the timing signal is transmitted to the repairing IC synchronously. A time T1 necessary for the scan signal to scan an adjacent scan line is calculated by the repairing IC. Then, in case there is a broken scan line, the repairing IC will be triggered to output a repairing signal through calculation so that the scanning signal is re-acquired in the broken section of the scan line. In this way, the TFTs corresponding to the broken section of the scan line can be turned on.

S3: connecting the detection line to the $n^{th}$ last non-defective scanning line before the broken line through fusion.

S4: connecting the repairing line to the broken line through fusion.

By using laser technology, the $n^{th}$ last scan line preceding the broken line and the detection line, as well as the broken line and the repairing line can be fused together at the positions where they intersect with each other respectively. In this way, the metals material at the intersection positions will be fused together so that electric paths will be formed therebetween respectively.

The repairing IC is not merely limited to be soldered onto the module circuit board of the LCD, but may also be disposed at other sites provided that it is connected to the timing controller, the detection line and the repairing line.

When the timing controller controls the scanning signal to scan the $n^{th}$ last scan line preceding the broken line, the scanning signal is transmitted to the repairing IC via the detection line. Upon detecting this signal, the repairing IC is triggered to output a repairing signal after a time $T=n*T1$. The repairing signal is transmitted to the broken scan line via the repairing line so that the scan signal is re-acquired in the broken section. At this time point, the timing controller also controls the scan signal to scan the normal section of the broken scan line. Through scanning from both sides, the broken scan line can resume the normal operation. In case there is a plurality of broken lines, the repairing IC will also output a repairing signal at the time $T=(n+m+1)*T1$ so that the plurality of broken lines are all repaired. The array substrate of the LCD in the above embodiment is just another subject matter of the present disclosure, and it will not be further described herein.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A liquid crystal display (LCD), comprising an array substrate and a timing controller, the array substrate comprising a plurality of scan lines, the timing controller being configured to output a timing signal for controlling a scanning signal to scan the scan lines one by one, the LCD further comprising:

a detection line located on the array substrate and overlapped with the scan lines without electrically connecting to the scan lines, being adapted to connect a nth last non-defective scan line preceding a broken line to a repairing IC so that when the scanning signal scans the nth last non-defective scan line preceding the broken line, the scanning signal is transmitted to a repairing IC;

the repairing IC, being connected to the timing controller and configured to obtain a time T1 necessary for the scanning signal to scan an adjacent scanning line and output a repairing signal at a time $T=n*T1$ after the scanning signal has been received; and a repairing line located on the array substrate and overlapped with the scan lines, being adapted to connect the broken line to the repairing IC so that the repairing signal is transmitted to the broken line to repair the broken line.

2. The LCD of claim 1, wherein the repairing line includes a first repairing line and a second repairing line, and when there are two broken lines, the first repairing line and the second repairing line connect to the two broken lines respectively.

3. The LCD of claim 2, wherein the repairing IC is also configured to, when there are two broken scanning lines, output the repairing signal at the time $T=n*T1$ and then output the repairing signal again at a time $T=(n+m+1)*T1$, wherein m is the number of scanning lines between the two broken lines.

4. The LCD of claim 1, wherein the detection line and the repairing line connect to the repairing IC respectively in a COF manner or a COG manner.

5. The LCD of claim 4, wherein the repairing IC is integrated on a circuit board of an LCD panel module.

6. The LCD of claim 5, wherein the repairing line and the broken line are fused together by means of laser.

7. The LCD of claim 6, wherein the detection line and the nth last non-defective scan line preceding the broken line are fused together by means of laser.

8. The LCD of claim 7, wherein the repairing IC is soldered to the circuit board of the LCD panel module.

9. The LCD of claim 3, wherein the detection line and the repairing line connect to the repairing IC respectively in a COF manner or a COG manner.

10. An array substrate of an LCD, comprising a plurality of scan lines, the LCD comprising a timing controller configured to output a timing signal for controlling a scanning signal to scan the scan lines one by one, the array substrate further comprising:
a detection line located in a vertical direction on the array substrate and overlapped with the scan lines without electrically connecting to the scan lines, being adapted to connect a nth last non-defective scan line preceding a broken line to a repairing IC so that when the scanning signal scans the nth last non-defective scan line preceding the broken line, the scanning signal is transmitted to a repairing IC;
the repairing IC, being connected to the timing controller of the LCD and configured to obtain a time T1 necessary for the scanning signal to scan an adjacent scanning line and output a repairing signal at a time $T=n*T1$ after the scanning signal has been received; and
a repairing line located in a vertical direction on the array substrate and overlapped with the scan lines, being adapted to connect the broken line to the repairing IC so that the repairing signal is transmitted to the broken line to repair the broken line.

11. The array substrate of claim 10, wherein the repairing line includes a first repairing line and a second repairing line, and when there are two broken lines, the first repairing line and the second repairing line connect to the two broken lines respectively.

12. The array substrate of claim 11, wherein the repairing IC is also configured to, when there are two broken scanning lines, output the repairing signal at the time $T=n*T1$ and then output the repairing signal again at a time $T=(n+m+1)*T1$, wherein m is the number of scanning lines between the two broken lines.

13. The array substrate of claim 10, wherein the detection line and the repairing line connect to the repairing IC respectively in a COF manner or a COG manner.

14. The array substrate of claim 13, wherein the repairing IC is integrated on a circuit board of an LCD panel module.

15. The array substrate of claim 14, wherein the repairing line and the broken line are fused together by means of laser.

16. The array substrate of claim 15, wherein the detection line and the nth last non-defective scan line preceding the broken line are fused together by means of laser.

17. The array substrate of claim 16, wherein the repairing IC is soldered to the circuit board of the LCD panel module.

18. The array substrate of claim 12, wherein the detection line and the repairing line connect to the repairing IC respectively in a COF manner or a COG manner.

* * * * *